US006435370B1

(12) United States Patent
Wilson

(10) Patent No.: US 6,435,370 B1
(45) Date of Patent: Aug. 20, 2002

(54) MEDICATION PACKAGE EJECTION MECHANISM

(75) Inventor: Ronald H. Wilson, Bothell, WA (US)

(73) Assignee: NextRx Corporation, Bothell, WA (US)

( * ) Notice: Subject to any disclaimer, the term of this patent is extended or adjusted under 35 U.S.C. 154(b) by 146 days.

(21) Appl. No.: 09/655,568

(22) Filed: Sep. 6, 2000

(51) Int. Cl.[7] .................................. B65G 59/00

(52) U.S. Cl. .................................. 221/251; 221/270

(58) Field of Search .................................. 221/251, 268, 221/270; 414/797.9, 798.1

(56) References Cited

U.S. PATENT DOCUMENTS 1,887,197 A * 11/1932 Giles
3,799,394 A * 3/1974 Hemard ....................... 221/251
5,547,106 A * 8/1996 Samonsky .............. 221/270 X
5,755,551 A * 5/1998 Saeki et al. .......... 414/797.9 X

* cited by examiner

*Primary Examiner*—David H. Bollinger
(74) *Attorney, Agent, or Firm*—Jensen & Puntigam, P.S.

(57) ABSTRACT

The ejection mechanism includes an elongated housing for storing medication packages of uniform configuration. An eject member moves between two positions, including a first, rest position and a second, eject position. An actuator moves the eject member between its two positions. A clamping member which forms part of one wall of the housing near the lower end thereof is spring biased so as to clamp the medication packages in place, except for the lowermost package, during the time that the lowermost package is begin ejected from the housing assembly. A cam member portion of the clamping member interacts physically with the eject member in such a manner that as the eject member moves from its rest position to its eject position, the clamping member is allowed to move inwardly, clamping those packages above the lowermost package. When the eject member is in its rest position, the clamping member is held away from the packages, permitting them to move downwardly in the housing assembly.

5 Claims, 2 Drawing Sheets

MEDICATION PACKAGE EJECTION MECHANISM

TECHNICAL FIELD

This invention relates generally to medication-dispensing apparatus, and more particularly concerns an automatic medication dispensing apparatus which includes a magazine member for medication-containing packages, the packages typically being uniform in size.

BACKGROUND OF THE INVENTION

In automatic medication dispensing systems in general, reliability and speed are primary concerns. Many systems are either too slow, particularly where a large number of medications are needed for a particular patient, or do not provide consistent, reliable results (reliable ejection of a desired medication) at high speed, which is important for automatic operation.

Many of the current medication dispensing systems are complex and/or sophisticated structurally and as such are expensive to manufacture and maintain, as well as being susceptible to failure. The expense of a complete system is a primary concern where a large number of individual medication dispensing devices are necessary to implement a particular medication-dispensing system. Such a system desirably has the capability of dispensing a large number of different medications to a single collection point, such as the system shown and described in co-pending U.S. patent application Ser. No. 09/085,968, owned by the assignee of the present invention. In that system, however, the individual dispensing devices result in the overall system becoming relatively expensive, complex, and somewhat cumbersome to operate and maintain.

Hence, it is desirable that a medication-dispensing device used in medication dispensing systems be not only reliable and fast, but also relatively inexpensive to manufacture and maintain.

Still further, in large, complex dispensing systems involving many medications, it is often important that the individual medication-dispensing devices have a relatively small footprint, so that a large number of such devices can be arranged closely together within a given space.

DISCLOSURE OF THE INVENTION

Accordingly, the present invention is a dispensing mechanism for medication packages, comprising: a housing assembly which is arranged to store medical element-containing packages, wherein the packages move downwardly within the housing when they are unclamped; a clamping assembly for maintaining the packages in place within the housing assembly, except for a lowermost package during a selected time when the lowermost package is being ejected from the housing assembly, the clamping assembly including a clamping member having two positions, wherein in one position said packages are clamped except for the lowermost package and in the other position the packages are released, permitting the packages to move downwardly within the housing assembly; an eject member which moves between a first, rest position and a second, eject position, wherein the eject member moves the lowermost package out of the housing assembly as the eject member moves from its first to its second position; and an actuator member for moving the eject member between its first and second positions, wherein the clamping member is configured and arranged such that when the eject member is in its first position, the clamping member clamps those packages in the housing above the lowermost package, preventing them from moving downwardly in the housing while permitting the lowermost package to be ejected from the housing by the eject member.

BEST MODE FOR CARRYING OUT THE INVENTION

The individual medication-ejection device/mechanism of the present invention will typically be used as part of a larger medication-dispensing system. One such system, shown in the co-pending application referenced above, uses a plurality of groupings of medication-ejection devices, with each grouping containing 55–70 individual ejection devices, with each ejection device containing a plurality of the same medication. Typically, regardless of the size of the overall medication dispensing system, each individual medication-ejection apparatus will contain the same medication. The medication typically, although not necessarily, is contained in individual uniform-sized packages, with each package containing a single unit of use.

Although the present invention is described in terms of a medication-ejection device, other medical elements, such as, for instance, syringes, etc., can be packaged and dispensed by the present device. One particular package embodiment is a blister-style package. The dimensions of a typical package are 2 inches by 3 inches by 0.18 inches. The lower side is flat, while the opposing upper side has raised blistered surfaces which provide space between adjacent packages when the packages are stacked vertically in the dispensing apparatus. It should be understood, however, that other package configurations and arrangements can be used in the apparatus of the present invention.

In the overall dispensing system, each individual medication-dispensing device is activated by a central computer-program based controller. Typically, each patient will have several prescribed medications as well as possibly other medical elements appropriate for his/her particular treatment. The controller will provide appropriate drive signals to activate the appropriate medication dispensing devices, which will each dispense a single medication package (or as many as is prescribed) for a particular time interval.

The medications will fall into a collection assembly, which in the co-pending patent application is a funnel, along which the dispensed medication package moves to a central collection point, where the various medications for a selected patient are gathered and directed to a medication bin or device associated with a particular patient. The filled medication bin can then be provided to the individual patient or to a nursing station where the medications in the bin are administered at the appropriate time to the patient.

Figure 1:
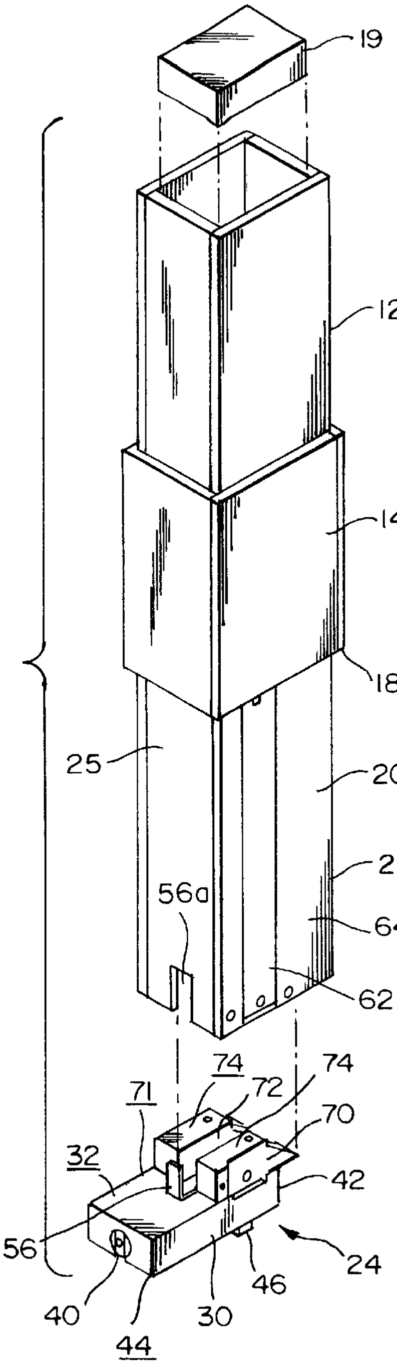
FIG. 1 is an isometric, partially exploded view of the medication dispensing mechanism of the present invention, including a magazine for storage of medications to be ejected.

The present invention is directed toward the individual medication dispensing device. Referring now to FIG. 1, the dispensing apparatus includes an upper magazine, cassette or cartridge member 12. In the embodiment shown, cartridge member 12 is rectangular in cross-section, having internal dimensions to accommodate a selected medication package. In the embodiment shown, cartridge 12 is approximately 48 inches high and 2.5×3.5 inches square. The cartridge has four walls, made from a plastic material, such as acrylic, with each wall being approximately ¼ inch thick; the walls are joined together along their respective longitudinal edges to form the cartridge.

In the embodiment shown, cartridge 12 fits into a connecting member 14, which has two opposing open ends and is dimensioned to conveniently receive cartridge 12 at one end 15. This arrangement permits a cartridge 12 with a load of medication packages therein to be conveniently inserted and then removed (when empty) from the medication-dispensing apparatus. However, it should be understood that such an arrangement is not necessary to the present invention.

Figure 2:
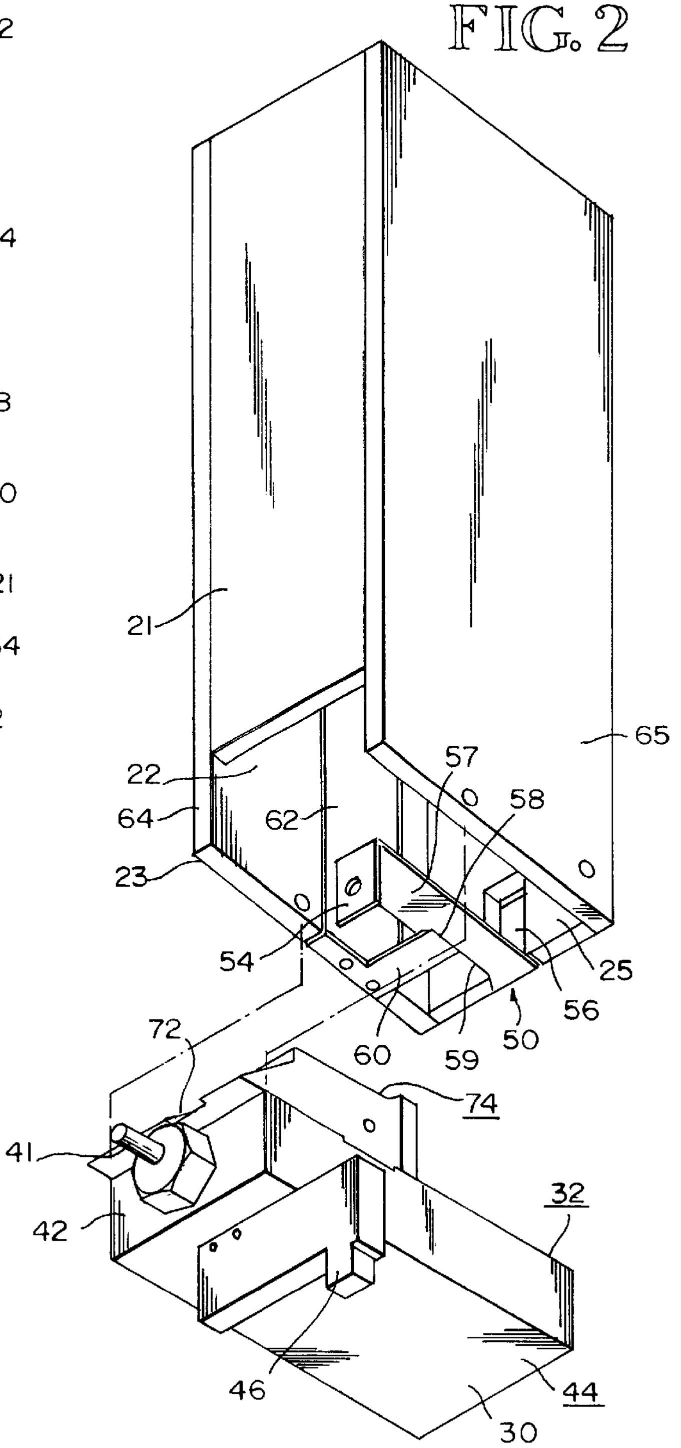
FIG. 2 is an isometric view of a portion of the system of FIG. 1.

In the embodiment shown, connector member 14 is approximately 3.5 inches long and is rectangular in cross-section, like cartridge 12, and has internal dimensions substantially identical to the external dimensions of the cartridge. Extending from the opposing end 18 of connector 14 is a package housing 20. Housing 20 is also rectangular in cross section. As seen in FIG. 2, one wall 21 has an opening 22 at free end 23 of the housing, to permit a medication package to be ejected from the housing. Typically, the top end of housing 20 and the lower end of cartridge 12 will abut each other within connector 14, so that packages move freely from cartridge 12 into housing member 20. The top end of cartridge 12 is typically open, permitting additional packages 19 to be conveniently placed into the cartridge when needed, thereby maintaining a constant supply of packaged medications. Alternatively, an empty cartridge can be removed and replaced with a full one.

At the other end of housing 20, away from connector 14, is the ejector assembly, shown generally at 24. Ejector assembly includes a base member 30. Base member 30 is generally rectangular in shape, with one surface 32 generally abutting the free end 23 of housing 20. Positioned within base member 30 is a conventional air cylinder 40. Air cylinder 40 includes a piston rod 41 which extends from the other end 42 of base member 30. Attached to rear surface 44 of base member 30 is an air valve 46 to receive compressed air. The source of compressed air is not shown. The compressed air activates the air cylinder 40, forcing the piston rod to move.

The piston rod 41 from air cylinder 40 is connected to a slider element 50. Slider element 50 is a thin elongated metal element which includes a central portion and two tab portions 54 and 56 at the ends of the central portion. End tab portions 54 and 56 extend in opposing directions, with end tab ortion 54 extending downwardly from the free end 23 of the housing, alongside end 42 of base member 30. The piston rod 41 of the air cylinder extends through an opening in end tab 54.

The opposing end tab portion 56 extends upwardly of the housing, positioned in a small slot 56a in one wall 25 of housing 20 when slider 50 is in a first (nontranslated) position, i.e. when air cylinder 40 is not activated. End tab portion 56 is configured and positioned to abut against a rear edge of the lowermost medication package in housing 20.

When air cylinder 40 is actuated, piston rod 41 moves outwardly from end base member 30, moving slider 50 laterally across the lower end of housing 20. End tab portion 56 of slider 50 begins to move the lowermost package laterally out of the housing. The full reach of piston rod 41, and hence the movement of slider 50, is approximately 1.5 inches, sufficient to move the lowermost medication package out of housing 20 through opening 22.

Figure 3:
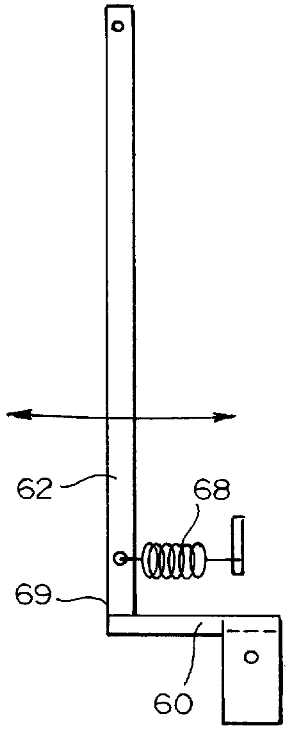
FIG. 3 is an isometric view of a portion of the system of FIG. 2.
Figure 4A:
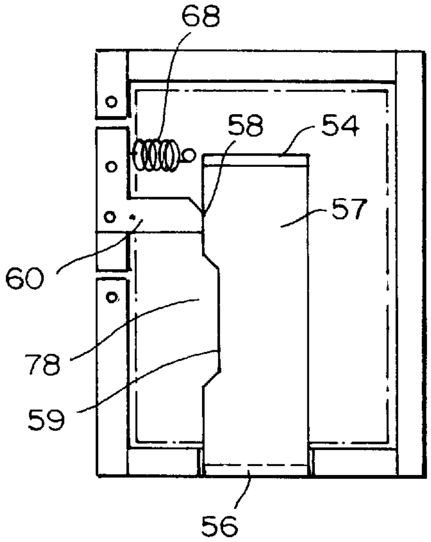
FIGS. 4A and 4B show two operating positions of the ejector assembly mechanism of the system of FIG. 1.
Figure 4B:
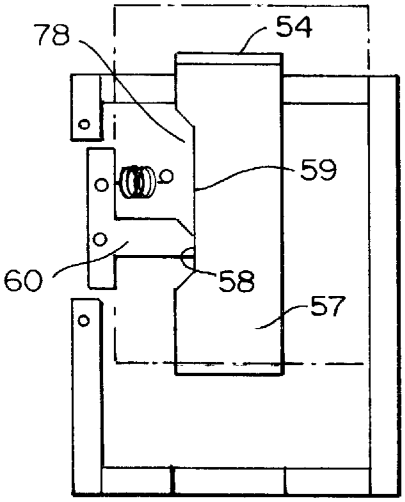

Slider 50 in operation moves between two positions. Referring to FIGS. 3, 4A and 4B, in slider 50's first position (non-actuated), one edge 59 of central portion 57 of slider 50 interacts with an end edge 58 of a cam element 60, which is in turn connected to one end of a clamp 62 which is an elongated member forming part of one wall 64 of housing 20. In the embodiment shown, clamp 62 extends approximately the full length of housing 20 and is approximately 1⅛ inches wide. Clamp 62 is fixed at one end 66 thereof. Clamp 62 is furthermore biased inwardly by a spring member 68 which extends between the free end 69 of clamp 62 and a pin in a block member 70, which is secured to one surface 71 of base member 30.

Block member 70 includes a longitudinal slot 72 therein through which end tab portion 56 moves when it translates by the action of piston rod 41. End tab portion 56 extends sufficiently above upper surfaces 74 of block 70 that it can hook the rear edge surface of the lowermost package in housing 20. The lowermost package in the housing rests on upper surfaces 74 of block 70.

As indicated briefly above, slider 50 physically interacts with cam element 60 to clamp and unclamp the medication packages positioned above the lowermost one within the housing. When slider 50 is in a first (non-translated) position, with the air cylinder not activated, as shown in FIGS. 1, 2 and 4A, the free edge 58 of cam 60 abuts a particular section 61 of edge 59 of central portion 57 of the slider to force it outwardly, such that clamp 62 is flush with the adjacent portions of wall 64 of the housing (FIG. 1).

In this position, clamp 62 is relatively away from the medication packages, against the action of spring 68. The medication packages are all unclamped and thus free to move downwardly so that the lowermost package is directly against upper surfaces 74 of block 70, with the remaining packages stacked above it. When slider 50 is in its first position and air cylinder 40 is not activated, the packages in the housing are not clamped.

When air cylinder 40 is activated in order to eject the lowermost package in the housing, slider 50 begins to translate, as discussed above, which results in the lowermost package beginning to move laterally out of the housing, through opening 22. As slider 50 moves, a cutout portion 78 in edge 59 of slider 50 comes into registry with the free end 58 of cam element 60, permitting cam 60 and clamp 62 to move inwardly under the action of spring 68. This is shown in FIG. 4B.

At its innermost position, because of the bias of spring 68, clamp 62 clamps the medication packages in place against the internal surface of opposing wall 65 of housing 20, specifically those packages above the lowermost package, which is free to move. The lower end of clamp 62 extends only to the next lowermost package in the housing. A notch 69 prevents the lowermost package from being clamped. As slider 50 translates, the lowermost package is moved out of housing 20 through opening 22 therein. Cutout portion 78 in edge 59 is sufficiently long to allow the packages remaining in the housing to be clamped during the entire time that the lowermost package is being ejected from the housing.

When the ejection of the lowermost package is complete, slider 50 is moved back to its first position by air cylinder 40. As slider 50 moves back into its first position, the free end

58 of cam 60 loses contact with cutout portion 78 of edge 59 of slider 50, encountering again section 61 of edge 59. This results in cam 60 and clamp 62 being moved outwardly, against the action of spring 68. This releases the clamped medication packages, allowing them to move downwardly in the housing, such that the new lowermost package abuts against upper surfaces 74 of block 72.

In summary, medication packages are either loaded into the apparatus at the top of cartridge 12, or the entire cartridge is removed and a new one inserted, loaded with medication packages. Individual medication packages are then ejected one at a time under computer control, by the action of air cylinder 40 and slider 50. A computer program controls the sequence and timing of all of the individual steps in the operation of medication-dispensing apparatus. A spring-biased clamp 62 is used to clamp those packages above the lowermost package in the housing during the time that the lowermost package is ejected. After the lowermost package is ejected, the clamped packages are allowed to move downwardly within housing 20. The ejected package typically falls into a channel or trough beneath the dispensing structure, from which point it is moved to a location where it can be loaded along with other medications and elements into a patient bin.

Although a preferred embodiment of the invention has been disclosed herein for illustration, it should be understood that various changes, modifications and substitutions may be incorporated into such embodiment without departing from the spirit of the invention, which is defined by the claims which follow.

What is claimed is:

1. A dispensing system for medication packages, comprising:

a housing assembly for storage of medical element-containing packages, arranged such that said packages, when unclamped, can move downwardly within the housing member;

a clamping member for maintaining said packages in place, within the housing assembly, except for a lowermost package, during a selected time when the lowermost package is being ejected from the housing assembly, the clamping assembly including a clamping member having two positions, wherein in one position said packages are clamped except for the lowermost package and in the other position the packages are released, permitting said packages to move downwardly within the housing assembly;

an eject member which moves between a first rest position and a second eject position, wherein the eject member moves the lowermost package out of the housing assembly as the eject member moves from its first to its second position; and an actuator member for moving the eject member between its first and second positions, wherein the clamping member is configured and arranged and interacts with the eject member such that when the eject member is in its first position, said packages in the housing are not clamped, but as the eject member is moved from its first position into its second position, the clamping member clamps those packages in the housing above the lowermost package, preventing them from moving downwardly in the housing while permitting the lowermost package to be ejected from the housing by the eject member.

2. A system of claim 1, wherein the housing assembly includes an opening in one wall thereof near a lower end thereof through which the lowermost package is ejected from the housing assembly.

3. A system of claim 1, wherein the clamping member extends longitudinally of the housing assembly and forms part of one wall thereof, the clamping assembly including means for biasing the clamping member inwardly against said packages, wherein the eject member and the clamping member are so configured and positioned relative to each other that the clamping member is forced outwardly away from the packages into its first position where it is substantially flush with the housing assembly wall when the eject member is in its first position, and further such that as the eject member moves into its second position from its first position, the clamping member moves inwardly by said biasing means clamping said packages.

4. A system of claim 3, wherein the clamping member includes a cam member which extends inwardly of the housing, wherein the eject member includes an edge surface which includes a cutout portion and a jutting portion, arranged such that when the eject member is in its first position, the jutting portion of the edge surface of the eject member abuts against the cam member, forcing it and the clamping member outwardly away from the packages, while when the eject member is ejecting the lowermost package from the housing assembly, the cam member abuts the cutout portion, permitting the clamping member to move inwardly, clamping the packages except for the lowermost one, which is being ejected from the housing assembly.

5. A system of claim 4, including a base member mounted to a lower end of the housing assembly, the base member having mounted therein an air cylinder which includes a piston rod which is movable in response to air from a source thereof, the piston rod being connected to the eject member, wherein the system further includes a block member mounted to an upper surface of the base member such that the block member extends into the lower end of the housing assembly, the block member having an upper surface against which the lowermost medication package rests, wherein the eject member moves through a slot in the block member in operation, the eject member having a portion which extends sufficiently above the facing surface of the block member to hook against an edge of the lowermost medication package, so that the eject member moves the lowermost package out of the housing assembly as the eject member moves from its first position to its second position.

* * * * *